(12) United States Patent
Iseya (10) Patent No.: US 12,134,252 B2
(45) Date of Patent: Nov. 5, 2024

(54) DECORATIVE SHEET

(71) Applicant: TOPPAN INC., Tokyo (JP)

(72) Inventor: Takahiro Iseya, Tokyo (JP)

(73) Assignee: TOPPAN INC., Tokyo (JP)

( * ) Notice: Subject to any disclaimer, the term of this patent is extended or adjusted under 35 U.S.C. 154(b) by 0 days.

(21) Appl. No.: 17/956,438

(22) Filed: Sep. 29, 2022

(65) Prior Publication Data

US 2024/0109278 A1 Apr. 4, 2024

(51) Int. Cl.
*B32B 27/10* (2006.01)
*B32B 27/32* (2006.01)
(Continued)

(52) U.S. Cl.
CPC ............. *B32B 27/10* (2013.01); *B32B 27/32* (2013.01); *C09D 11/033* (2013.01); *D21H 19/20* (2013.01); *D21H 19/44* (2013.01); *D21H 19/68* (2013.01); *B32B 2255/10* (2013.01); *B32B 2255/26* (2013.01); *B32B 2255/28* (2013.01);
(Continued)

(58) Field of Classification Search
CPC ..... B32B 27/20; B32B 27/32; B32B 2255/10; B32B 2255/12; B32B 2255/26; B32B 2255/28; B32B 2307/4023; B32B 2307/75; B32B 2451/00; B41M 1/36; B41M 5/506; B41M 5/52; C09D 11/033; C09D 11/38; D21H 19/20; D21H 19/44; D21H 19/68
See application file for complete search history.

(56) References Cited

U.S. PATENT DOCUMENTS 5,665,457 A * 9/1997 Sato ........................ B44F 9/02
156/275.5
2007/0048505 A1* 3/2007 Shimada ................... B44C 1/10
428/195.1
(Continued)

FOREIGN PATENT DOCUMENTS

JP 02176647 A * 7/1990
JP 05329437 A * 12/1993
(Continued)

OTHER PUBLICATIONS

Machine translation of JP 2020-075442 via EPO (Year: 2020).*
(Continued)

*Primary Examiner* — Ian A Rummel
*Assistant Examiner* — Rebecca L Grusby
(74) *Attorney, Agent, or Firm* — Squire Patton Boggs (US) LLP (57) ABSTRACT

There is provided a decorative sheet having high ink adhesion without using an oil-based ink having a high environmental load. The decorative sheet includes: a base paper; a thermoplastic resin layer provided on one surface side of the base paper; an ink layer provided on the thermoplastic resin layer of opposite to the base paper side and containing a water-based ink and at least one of a xylene diamine-based curing agent, a polycarbodiimide-based curing agent, and an aziridine-based curing agent as a curing agent; and a surface protective layer provided on the opposite surface side to the thermoplastic resin layer of the ink layer. The addition amount of the curing agent in the ink layer is preferably 1 part by mass or more and 30 parts by mass or less based on 100 parts by mass of the water-based ink.

3 Claims, 3 Drawing Sheets

(51) Int. Cl.
*C09D 11/033* (2014.01)
*D21H 19/20* (2006.01)
*D21H 19/44* (2006.01)
*D21H 19/68* (2006.01)

(52) U.S. Cl.
CPC ... *B32B 2307/4023* (2013.01); *B32B 2307/75* (2013.01); *B32B 2451/00* (2013.01)

(56) References Cited

U.S. PATENT DOCUMENTS

| | | | |
|---|---|---|---|
| 2008/0220224 | A1 | 9/2008 | Tokumoto et al. |
| 2016/0325558 | A1* | 11/2016 | Strijckers ............. B44C 5/0469 |
| 2017/0297354 | A1* | 10/2017 | Van Den Bergen ... B41M 7/009 |
| 2018/0044548 | A1 | 2/2018 | Servante et al. |

FOREIGN PATENT DOCUMENTS

| | | | | |
|---|---|---|---|---|
| JP | H061939 | A | * | 1/1994 |
| JP | H08-150693 | A | | 6/1996 |
| JP | 2000-218747 | A | | 8/2000 |
| JP | 2001113638 | A | * | 4/2001 |
| JP | 2002311832 | A | * | 10/2002 |
| JP | 2003011315 | A | * | 1/2003 |
| JP | 2006-205709 | A | | 8/2006 |
| JP | 2006-272936 | A | | 10/2006 |
| JP | 2008-247020 | A | | 10/2008 |
| JP | 2013-018231 | A | | 1/2013 |
| JP | 2016-006181 | A | | 1/2016 |
| JP | 2019-073017 | A | | 5/2019 |
| JP | 2020-075442 | A | | 5/2020 |
| WO | WO-2010114899 | A1 | * | 10/2010 ........... C08G 18/797 |
| WO | WO-2021261585 | A1 | * | 12/2021 |

OTHER PUBLICATIONS

Machine translation of JP 2002-311832 via EPO (Year: 2002).*
Machine translation of JP 2001-113638 via EPO (Year: 2001).*
Machine translation of JP 2003-011315 via EPO (Year: 2003).*
Machine translation of JP H061939 via EPO (Year: 1994).*
Machine translation of WO 2021/261585 via EPO (Year: 2021).*
Machine translation of JP 2013-018231 via EPO (Year: 2013).*
Machine translation of JP H02176647 via EPO (Year: 1990).*
Machine translation of JP H05329437 via EPO (Year: 1993).*
International Search Report and Written Opinion for International Application No. PCT/JP2023/035669 dated Dec. 5, 2023, 11 pages.
Hara, "Curing Agents for Epoxy Resin," Three Bond Technical News, vol. 32, 1990, pp. 1, 3 & 10, 6 pages.

* cited by examiner

DECORATIVE SHEET

TECHNICAL FIELD

The present disclosure relates to a decorative sheet.

BACKGROUND ART

Conventionally, a decorative sheet has been proposed in which a thermoplastic resin layer, a pattern layer, and a surface protective layer are deposited in this order on one surface side of a base paper, for example. On such a decorative sheet, a pattern is printed using an oil-based ink, such as an acrylic ink, for example, because the pattern to be printed is clearly and neatly printed and the quick drying property is high (see, for example, JP 2020-075442 A).

SUMMARY

It is an object of the present disclosure to obtain a decorative sheet having high ink adhesion without using an oil-based ink having a high environmental load.

To achieve the above-described object, a decorative sheet according to one aspect of the present disclosure includes: a base paper; a thermoplastic resin layer provided on one surface side of the base paper; an ink layer provided on the thermoplastic resin layer of opposite to the base paper side and containing a water-based ink and at least one of a xylene diamine-based curing agent, a polycarbodiimide-based curing agent, and an aziridine-based curing agent as a curing agent; and a surface protective layer provided on the opposite surface side to the thermoplastic resin layer of the ink layer.

In addition, a decorative sheet according to another aspect of the present disclosure includes: a base paper; a thermoplastic resin layer provided on one surface side of the base paper; an ink layer provided on the opposite surface side to the base paper of the thermoplastic resin layer and containing a water-based ink and at least one of a xylene diamine-based curing agent, a polycarbodiimide-based curing agent, and an aziridine-based curing agent as a curing agent; and a surface protective layer provided on the opposite surface side to the thermoplastic resin layer of the ink layer.

One aspect of the present disclosure can provide a decorative sheet having high ink adhesion without using an oil-based ink.

DESCRIPTION OF EMBODIMENTS

One embodiment of the present disclosure will now be described with reference to the drawings.

Herein, the drawings are schematic, and the relationship between the thickness and the plane dimension, the ratio of the thickness of each layer, and the like are different from the actual relationship, ratio, and the like. The embodiment described below exemplifies the configuration for embodying the technical idea of the present disclosure. The technical idea of the present disclosure does not specify materials, shapes, structures, and the like of constituent parts to the materials, shapes, structures, and the like described below. The technical idea of the present disclosure can be variously altered within the technical scope specified by claims.

1. First Embodiment (1. 1) Basic Configuration of Decorative Sheet

Figure 1:
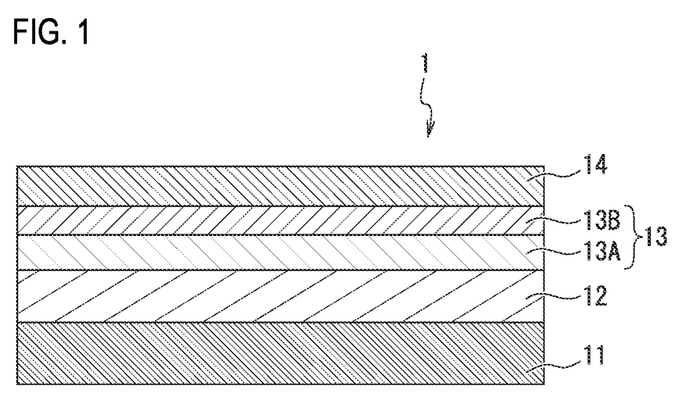
FIG. 1 is a cross-sectional view illustrating one configuration example of a decorative sheet according to one embodiment of the present disclosure.

Hereinafter, a decorative sheet 1 according to one embodiment of the present disclosure is described with reference to FIG. 1. As illustrated in FIG. 1, the decorative sheet 1 includes at least a base paper 11, a thermoplastic resin layer 12, an ink layer 13, and a surface protective layer 14. In this embodiment, the ink layer 13 includes a solid ink layer 13A provided on the thermoplastic resin layer 12 side and a pattern layer 13B. In the decorative sheet 1 according to one embodiment of the present disclosure, the ink layer 13 is formed of a water-based ink containing at least one of a xylene diamine-based curing agent, a polycarbodiimide-based curing agent, and an aziridine-based curing agent as a curing agent.

Hereinafter, each layer of the decorative sheet 1 is described in detail.

<Base Material Layer>

In the decorative sheet 1, a base material layer is formed by the base paper 11 and the thermoplastic resin layer 12.

(Base Paper)

The base paper 11 is a layer serving as the base of the decorative sheet 1. As the base paper 11, an inter-paper reinforced paper containing a resin between cellulose fibers is usable, for example. The inter-paper reinforced paper is preferably a material containing 50% by mass or more of cellulose fibers based on the total mass of the inter-paper reinforced paper. The inter-paper reinforced paper preferably has a thickness of 15 μm or more and less than 60 μm. The inter-paper reinforced paper preferably has a basis weight of 10 $g/m^2$ or more and 50 $g/m^2$ or less. Thus, the base paper 11 can be imparted with a sufficient thickness and stiffness as the base of the decorative sheet 1, so that the decorative sheet 1 is hard to be wrinkled and the occurrence of warpage or curling of the decorative sheet 1 can be prevented.

(Thermoplastic Resin Layer)

The thermoplastic resin layer 12 is a moisture-proof sheet-like layer provided on one surface side of the base paper 11. The "moisture-proof" refers to a property that makes it difficult for water vapor to penetrate.

The thermoplastic resin layer 12 is preferably a thermoplastic resin, such as an olefin resin with a melting point of 140° C. or higher and more preferably a thermoplastic resin, such as an olefin resin with a melting point of 150° C. or higher. Examples of the olefin resin include polypropylene (PP), polyethylene terephthalate (PET), polycarbonate (PC), polyvinyl alcohol (PVA), polyvinylidene chloride (PVDF), polyamide (PA), and the like. A resin material constituting the thermoplastic resin layer 12 is preferably selected according to a method for curing a resin material constituting the surface protective layer 14.

The ink layer 13 described later is formed using a water-based ink. Therefore, in the formation of the ink layer 13, the base material layer printed with the water-based ink is heated for drying the water-based ink. By setting the melting point of the resin material constituting the thermoplastic resin layer 12 to 140° C. or higher, the softening of the thermoplastic resin layer 12 in the formation of the ink layer 13 can be suppressed, and the occurrence of the warpage or the curling of the decorative sheet 1 can be prevented.

The thickness of the thermoplastic resin layer 12 is preferably 10 µm or more and preferably 20% or more based on the thickness of the base paper 11. Thus, the thermoplastic resin layer 12 can obtain a sufficient moisture-proof effect as the thermoplastic resin layer 12. The thickness of the thermoplastic resin layer 12 is preferably 90% or less based on the thickness of the base paper 11. Thus, the occurrence of the warpage or the curling of the decorative sheet 1 can be prevented.

The interlaminar strength between the base paper 11 and the thermoplastic resin layer 12 is preferably 1.1 N/cm or more. This can make it difficult for the thermoplastic resin layer 12 to separate from the base paper 11.

Immediately above the thermoplastic resin layer 12, the ink layer 13 formed of a water-based ink for printing is formed. Therefore, the surface on which the ink layer 13 is provided of the thermoplastic resin layer 12 may be subjected to treatment for improving the wettability. As the treatment for improving the wettability, corona treatment is mentioned, for example.

The thermoplastic resin layer 12 preferably contains at least one of an UV absorber and a light stabilizer to prevent a deterioration of weatherability. The thermoplastic resin layer 12 may contain antioxidants and the other various additives as appropriate.

<Ink Layer>

The ink layer 13 includes the solid ink layer 13A provided on the thermoplastic resin layer 12 side and the pattern layer 13B as described above.

(Solid Ink Layer)

The solid ink layer 13A is a layer for imparting a hue to the entire decorative sheet 1. The solid ink layer 13A is provided on the thermoplastic resin layer 12 of opposite to the base paper 11 side, i.e., the opposite surface side to the base paper 11 of the thermoplastic resin layer 12. The solid ink layer 13A covers the entire thermoplastic resin layer 12, and is imparted with a desired base color to ensure the concealability to the sticking surface of the decorative sheet 1.

In this embodiment, the solid ink layer 13A is formed of a water-based ink. The water-based ink contains a polyurethane-based resin and a water-based cross-linking agent, for example. The water-based ink may contain a two-component curing type urethane-based solventless adhesive containing a partially terminal acid-modified polyol component and a polyisocyanate component as an adhesive forming each adhesive layer. The polyisocyanate component is a mixture of aliphatic polyisocyanate and aromatic polyisocyanate, for example. The water-based ink does not contain volatile organic compounds (VOC), and thus can improve the environment of a production site and solve the problems caused by residual organic solvents in the decorative sheet 1.

The solid ink layer 13A further contains at least one of a xylene diamine-based curing agent, a polycarbodiimide-based curing agent, and an aziridine-based curing agent as a curing agent. When an isocyanate-based curing agent used in an oil-based ink is mixed with the water-based ink, the isocyanate-based curing agent reacts with water which is the solvent in the water-based ink and causes the gelation of the ink, so that the solid ink layer 13A cannot be formed. Therefore, there is a necessity of using the curing agent described above for the solid ink layer 13A of this embodiment using the water-based ink. For the solid ink layer 13A, a gravure printing method or a flexographic printing method is usable as a printing method, for example.

The addition amount of the curing agent described above in the solid ink layer 13A is preferably 1 part by mass or more and 30 parts by mass or less and more preferably 3 parts by mass or more and 10 parts by mass or less based on 100 parts by mass of the water-based ink. When the curing agent is added to the water-based ink in this range, the ink adhesion to the thermoplastic resin layer 12 of the solid ink layer 13A is improved.

(Pattern Layer)

The pattern layer 13B is a layer for imparting a design property by the design to the decorative sheet 1. The pattern layer 13B is a layer formed on the solid ink layer 13A serving as the base and subjected to printing indicating the pattern. The pattern layer 13B is formed of the water-based ink containing at least one of a xylene diamine-based curing agent, a polycarbodiimide-based curing agent, and an aziridine-based curing agent as a curing agent as with the solid ink layer 13A.

Any pattern is usable as the pattern of the pattern layer 13B. For example, a wood grain pattern, a stone grain pattern, a texture pattern, a cork pattern, an abstract pattern, or the like, or a combination of two or more kinds of these patterns or the like is usable.

(Surface Protective Layer)

The surface protective layer 14 is a layer for protecting the surface of the decorative sheet 1 and is provided on the opposite surface side to the thermoplastic resin layer 12 of the ink layer 13.

As materials of the surface protective layer 14, materials similar to those used in surface protective layers in conventional decorative sheets are usable without being particularly limited. For example, as the materials of the surface protective layer 14, thermosetting resins and ionizing radiation curable resins are usable, and water-based resins are preferable. The thermosetting resin is preferably a thermoplastic resin, such as an olefin resin. Examples of the olefin resin include polypropylene (PP), polyethylene terephthalate (PET), polycarbonate (PC), polyvinyl alcohol (PVA), polyvinylidene chloride (PVDF), polyamide (PA), and the like. As the ionizing radiation curable resins, compositions can be adopted which contain, as a main component, at least any one of prepolymers, oligomers, and monomers having polymerizable unsaturated bonds, such as (meth)acryloyl groups, having a property of causing a cross-linking reaction when irradiated with ionizing radiations, such as electron beams or ultraviolet rays, for example.

When the surface protective layer 14 contains the thermosetting resin, the surface protective layer 14 preferably contains at least one of the xylene diamine-based curing agent, the polycarbodiimide-based curing agent, and the aziridine-based curing agent together with the water-based resin. Due to the fact that the surface protective layer 14 contains the curing agents, the hardness of resins can be increased, and the solvent resistance and the scratch resistance of the surface protective layer 14 can be improved. A combination of the curing agent added to the surface protective layer 14 and the curing agent added to the ink layer 13 may be any combination.

The surface protective layer 14 may be a single layer or a multilayer of 2 to 3 layers. In the case of the multilayer, a gloss matte expression can be imparted by separately applying a matte resin and a gloss resin.

(1.2) Other Configurations of Decorative Sheet
(1.2.1) Another Configuration Example 1

Figure 2:
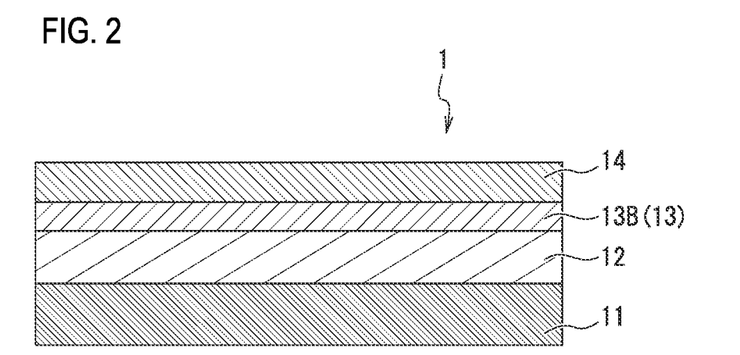
FIG. 2 is a cross-sectional view illustrating another configuration example of the decorative sheet according to one embodiment of the present disclosure.

The above-described embodiment gives the example in which the ink layer 13 includes the solid ink layer 13A and the pattern layer 13B, but the other configurations may be acceptable. For example, the solid ink layer 13A may be omitted from the ink layer 13 as illustrated in FIG. 2.

(1.2.2) Another Configuration Example 2

Figure 3:
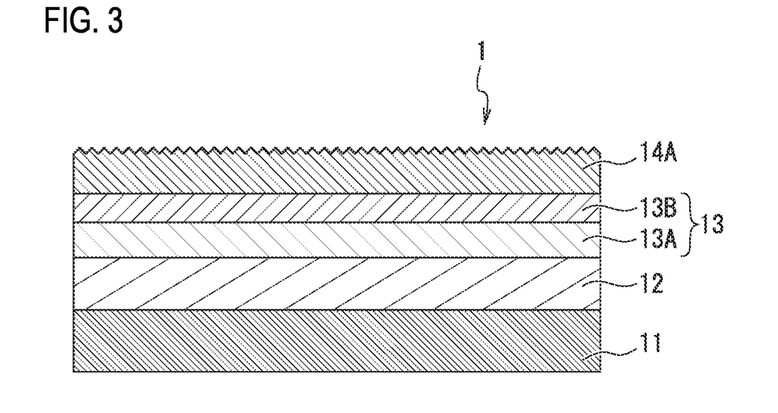
FIG. 3 is a cross-sectional view illustrating a still another configuration example of the decorative sheet according to one embodiment of the present disclosure.

The above-described embodiment gives the example in which the surface of the surface protective layer 14 is not treated, but the decorative sheet 1 may include a surface protective layer 14A which has been surface-modified in place of the surface protective layer 14. For example, it may be acceptable that, in the formation of the surface protective layer 14A, a resin material is applied, the resin material is irradiated with an ionizing radiation of a predetermined wavelength, and then the resin material is cured. Thus, the surface-modified surface protective layer 14A having an uneven shape on the surface can be formed as illustrated in FIG. 3.

The ionizing radiation emitted to the resin material is preferably an ionizing radiation having a shorter wavelength and higher energy because the ionizing radiation is more likely to cut molecular bonds of organic substances and cause surface shrinkage. As the ionizing radiation, a vacuum ultra violet (VUV) with a wavelength of 200 nm or less is preferably used, and specifically, an ionizing radiation with a central wavelength of 172 nm is preferably used.

(1.3) Effects of this Embodiment

The decorative sheet 1 according to this embodiment has the following effects.

(1) The decorative sheet 1 according to this embodiment includes: the base paper; the thermoplastic resin layer provided on one surface side of the base paper; the ink layer provided on the opposite surface side to the base paper of the thermoplastic resin layer and containing a water-based ink and at least one of a xylene diamine-based curing agent, a polycarbodiimide-based curing agent, and an aziridine-based curing agent as a curing agent; and the surface protective layer provided on the opposite surface side to the thermoplastic resin layer of the ink layer.

This can provide the decorative sheet having high ink adhesion and capable of suppressing the warpage or the curling of the decorative sheet without using an oil-based ink having a high environmental load.

(2) The decorative sheet according to this embodiment preferably includes at least one of the pattern layer and the solid ink layer as the ink layer.

Both the pattern layer and the solid ink layer are formed of the water-based ink containing at least one of a xylene diamine-based curing agent, a polycarbodiimide-based curing agent, and an aziridine-based curing agent as the curing agent. This can suitably form the pattern layer and the solid ink layer without causing the gelation.

(3) In the decorative sheet according to this embodiment, the addition amount of the curing agent in the ink layer is preferably 1 part by mass or more and 30 parts by mass or less based on 100 parts by mass of the water-based ink.

This improves the ink adhesion to the thermoplastic resin layer of the ink layer.

(4) In the decorative sheet according to this embodiment, the surface protective layer preferably contains the thermosetting resin as the water-based resin and at least one of a xylene diamine-based curing agent, a polycarbodiimide-based curing agent, and an aziridine-based curing agent.

This can increase the hardness of the resin, and thus can improve the solvent resistance and the scratch resistance of the surface protective layer.

(5) In the decorative sheet according to this embodiment, the surface protective layer preferably contains the ionizing radiation curable resin as the water-based resin.

This can increase the hardness of the resin, and thus can improve the solvent resistance and the scratch resistance of the surface protective layer.

(6) In the decorative sheet according to this embodiment, the thermoplastic resin layer is preferably formed of a thermoplastic resin with a melting point of 140° C. or higher.

This prevents the softening of the thermoplastic resin layer caused by heat applied in the formation of the ink layer using the water-based ink, and can suppress the warpage or the curling of the decorative sheet.

(7) In the decorative sheet according to this embodiment, the thermoplastic resin layer preferably contains at least one of a UV absorber and a light stabilizer.

This can improve the weather resistance of the base material layer, and thus can suppress the peeling off of the ink layer due to a deterioration of the base material layer.

EXAMPLES

Hereinafter, the present disclosure is described in more detail with reference to Examples, but the present disclosure is not limited to Examples.

Example 1

Polypropylene (PP) with a melting point of 165° C. containing a UV absorber (UVA) and a light stabilizer (HALS) is deposited on one surface of a base paper (HPN29 manufactured by TENTOK PAPER Co., Ltd.) by a melt extrusion forming method and cured to form a thermoplastic resin layer. The thickness of the thermoplastic resin layer after curing was 20 μm. Thus, a base material layer was formed in which the base paper and the thermoplastic resin layer were deposited. The interlaminar strength between the base paper and the thermoplastic resin layer was measured to be 1.2 N/cm. The interlaminar strength was measured using a load cell type tensile tester after the surface on the base paper side of the base material layer was fixed to a medium density fiberboard (MDF) with a double-sided tape, and then reinforced with a 25 mm wide scotch tape to prevent the tearing of the thermoplastic resin layer. The measurement conditions of the interlaminar strength at that time were a tensile speed of 200 mm/min and a measurement width (test piece width) of 25 mm.

Next, a solid ink layer was formed on the surface on the thermoplastic resin layer side of the base material layer by water-based gravure printing using a water-based ink (LTW205 manufactured by Liochem). The water-based ink was added with 6 parts by mass of a xylene diamine curing agent based on 100 parts by mass of the water-based ink as a curing agent, the mixture was diluted with water, and then gravure printing was performed, followed by drying, so that the solid ink layer was formed. Subsequently, a pattern was printed with a water-based ink containing a xylene diamine curing agent similar to that of the solid ink layer, and then dried, so that a pattern layer was formed. Thus, an ink layer containing the solid ink layer and the pattern layer was formed.

Subsequently, a thermosetting resin (LW163 manufactured by Liochem) as the water-based resin added with a xylene diamine curing agent as a curing agent was applied to the entire surface of the pattern layer. Thereafter, the curing agent added to the thermosetting resin was caused to react by performing curing at 50° C. for 24 hours to cure the thermosetting resin, so that the surface protective layer was formed. Thus, a decorative sheet of Example 1 was formed.

Example 2

A decorative sheet of Example 2 was formed in the same manner as in Example 1, expect for using polyethylene terephthalate (PET) with a melting point of 255° C. in place of polypropylene for the thermoplastic resin layer of the base material layer. The interlaminar strength between the base paper and the thermoplastic resin layer was 0.6 N/cm.

Example 3

A decorative sheet of Example 3 was formed in the same manner as in Example 1, except for using a polycarbodiimide-based curing agent in place of the xylene diamine curing agent as the curing agent added to the ink layer and the surface protective layer.

Example 4

A decorative sheet of Example 4 was formed in the same manner as in Example 1, except for using an aziridine-based curing agent in place of the xylene diamine curing agent as the curing agent added to the ink layer and the surface protective layer.

Example 5

A decorative sheet of Example 5 was formed in the same manner as in Example 1, except that the ink layer contained only the pattern layer.

Example 6

A decorative sheet of Example 6 was formed in the same manner as in Example 1, except that the ink layer contained only the pattern layer and a polycarbodiimide-based curing agent was used in place of the xylene diamine curing agent as the curing agent added to the ink layer and the surface protective layer.

Example 7

A decorative sheet of Example 7 was formed in the same manner as in Example 1, except that the ink layer contained only the pattern layer and an aziridine-based curing agent was used in place of the xylene diamine curing agent as the curing agent added to the ink layer and the surface protective layer.

Example 8

A decorative sheet of Example 8 was formed in the same manner as in Example 1, except that no UV absorber (UVA) or no light stabilizer (HALS) was added to the thermoplastic resin of the base layer.

Example 9

A decorative sheet of Example 9 was formed in the same manner as in Example 1, except that no curing agent was added to the surface protective layer.

Example 10

A decorative sheet of Example 10 was formed in the same manner as in Example 1, except for setting the addition amount of the xylene diamine curing agent added to the water-based ink of the solid ink layer and the pattern layer to 1 part by mass.

Example 11

A decorative sheet of Example 11 was formed in the same manner as in Example 1, except setting the addition amount of the xylene diamine curing agent added to the water-based ink of the solid ink layer and the pattern layer to 10 parts by mass.

Example 12

A decorative sheet of Example 12 was formed in the same manner as in Example 1, except setting the addition amount of the xylene diamine curing agent added to the water-based ink of the solid ink layer and the pattern layer to 30 parts by mass.

Example 13

A decorative sheet of Example 13 was formed in the same manner as in Example 1, except that the thermoplastic resin layer of the base material layer was formed using a medium density polyethylene (PE) with a melting point of 135° C. in place of polypropylene.

Example 14

As the surface protective layer, an electron beam curable resin added with no curing agents was used in place of the thermosetting resin, the electron beam curable resin was applied to the entire surface of a pattern layer, and the electron beam curable resin was irradiated with an electron beam to be cured, so that a surface protective layer was formed. A decorative sheet of Example 14 was formed in the same manner as in Example 1 except for the above.

Comparative Example 1

A decorative sheet of Comparative Example 1 was formed in the same manner as in Example 1, except that no curing agent was added to the water-based ink of the solid ink layer and the pattern layer and the water-based resin of the surface protective layer.

Comparative Example 2

A decorative sheet of Comparative Example 2 was formed in the same manner as in Example 1, except using isocyanate-based curing agent in place of the xylene diamine curing agent as the curing agent added to the water-based ink of the solid ink layer and the pattern layer and the water-based resin of the surface protective layer.

[Evaluation]

The decorative sheets obtained in Examples 1 to 14 and Comparative Examples 1 and 2 described above were evaluated as follows.

[Ink Adhesion Evaluation]

The ink adhesion of the decorative sheets was evaluated. For each of the decorative sheets obtained in Examples 1 to 14 and Comparative Examples 1 and 2, the surface protective layer was removed with an eraser, a scotch tape was pasted, and then the scotch tape was vigorously peeled off at an angle of 90°. The following three grades were used for the evaluation criteria.

A: Case where there was no surface where the ink layer was peeled off by the scotch tape.
B: Case where the ink layer was not peeled off by the scotch tape but the base paper was torn.
C: Case where the interface between the ink layer and the base material layer was peeled off by the scotch tape.

[Curling Property Evaluation]

The curling property of the decorative sheets by the formation of the ink layer was evaluated.

The decorative sheets obtained in Examples 1 to 14 and Comparative Examples 1 and 2 were cut into a size of 10 cm×10 cm to form samples. Next, each sample was placed on a flat surface under conditions of 25° C. and 50% RH and allowed to stand still for 48 hours. Then, the distances between the four corners of each sample and the flat surface were measured, and the average distance was calculated. The following three grades were used for the evaluation criteria.

A: The average distance between the four corners of the sample and the flat surface is 3 cm or less.
B: The average distance between the four corners of the sample and the flat surface is more than 3 cm and 5 cm or less.
C: The average distance between the four corners of the sample and the flat surface is more than 5 cm.

[Scratch Resistance Evaluation]

The decorative sheets obtained in Examples 1 to 14 and Comparative Examples 1 and 2 were subjected to a scratch resistance test in accordance with Class 32 of the European standard "EN 16094". Using the test results of 1 to 5 for each of two types of test methods, i.e., MSR-A3 and MSR-B3 tests, the evaluation was made based on the following three grades.

A: Case where the evaluation is 4 or higher.
B: Case where the evaluation is 3.
C: Case where the evaluation is 2 or lower.

The evaluation results above are shown in Table 1.

TABLE 1

| | Thermoplastic resin layer | | | Ink layer | | | Addition amount of curing agent | Solid ink layer | Surface protective layer | | Performance evaluation | | |
|---|---|---|---|---|---|---|---|---|---|---|---|---|---|
| | Material | Melting point [° C.] | UVA/HALS | Inter-laminar strength [N/cm] | Ink | Curing agent | [Part by mass] | | Resin material | Curing agent | Ink adhesion | Curling property | Scratch resistance |
| Ex. 1 | PP | 165 | Presence/Presence | 1.2 | Water-based ink | Xylene diamine | 3 | Presence | Thermosetting water-based resin | Xylene diamine | A | A | A |
| Ex. 2 | PET | 255 | Presence/Presence | 0.6 | Water-based ink | Xylene diamine | 3 | Presence | Thermosetting water-based resin | Xylene diamine | A | A | A |
| Ex. 3 | PP | 165 | Presence/Presence | 1.2 | Water-based ink | Polycarbo-diimide | 3 | Presence | Thermosetting water-based resin | Polycarbo-diimide | A | A | A |
| Ex. 4 | PP | 165 | Presence/Presence | 1.2 | Water-based ink | Aziridine | 3 | Presence | Thermosetting water-based resin | Aziridine | A | A | A |
| Ex. 5 | PP | 165 | Presence/Presence | 1.2 | Water-based ink | Xylene diamine | 3 | Absence | Thermosetting water-based resin | Xylene diamine | A | A | A |
| Ex. 6 | PP | 165 | Presence/Presence | 1.2 | Water-based ink | Polycarbo-diimide | 3 | Absence | Thermosetting water-based resin | Polycarbo-diimide | A | A | A |
| Ex. 7 | PP | 165 | Presence/Presence | 1.2 | Water-based ink | Aziridine | 3 | Absence | Thermosetting water-based resin | Aziridine | A | A | A |
| Ex. 8 | PP | 165 | Absence/Absence | 1.2 | Water-based ink | Xylene diamine | 3 | Presence | Thermosetting water-based resin | Xylene diamine | A | A | A |
| Ex. 9 | PP | 165 | Presence/Presence | 1.2 | Water-based ink | Xylene diamine | 3 | Presence | Thermosetting water-based resin | — | A | A | B |
| Ex. 10 | PP | 165 | Presence/Presence | 1.2 | Water-based ink | Xylene diamine | 1 | Presence | Thermosetting water-based resin | Xylene diamine | B | A | A |
| Ex. 11 | PP | 165 | Presence/Presence | 1.2 | Water-based ink | Xylene diamine | 10 | Presence | Thermosetting water-based resin | Xylene diamine | A | A | A |
| Ex. 12 | PP | 165 | Presence/Presence | 1.2 | Water-based ink | Xylene diamine | 30 | Presence | Thermosetting water-based resin | Xylene diamine | B | A | A |
| Ex. 13 | PE | 135 | Presence/Presence | 1.2 | Water-based ink | Xylene diamine | 3 | Presence | Thermosetting water-based resin | Xylene diamine | A | C | A |

TABLE 1-continued

| | | Thermoplastic resin layer | | | Ink layer | | | | Surface protective layer | | Performance evaluation | | |
|---|---|---|---|---|---|---|---|---|---|---|---|---|---|
| | Material | Melting point [° C.] | UVA/ HALS | Interlaminar strength [N/cm] | Ink | Curing agent | Addition amount of curing agent [Part by mass] | Solid ink layer | Resin material | Curing agent | Ink adhesion | Curling property | Scratch resistance |
| Ex. 14 | PP | 165 | Presence/ Presence | 1.2 | Water-based ink | Xylene diamine | 3 | Presence | Electron beam curable water-based resin | — | A | A | A |
| Comp. Ex. 1 | PP | 165 | Presence/ Presence | 1.2 | Water-based ink | — | — | Presence | Thermosetting water-based resin | — | C | A | B |
| Comp. Ex. 2 | PP | 165 | Presence/ Presence | 1.2 | Water-based ink | Isocyanate | 3 | Presence | Thermosetting water-based resin | Isocyanate | Unprintable due to gelation of ink | | |

As shown in Table 1, the decorative sheets of Examples containing the xylene diamine-based curing agent, the polycarbodiimide-based curing agent, or the aziridine-based curing agent in the water-based ink of the ink layer or the water-based ink of the ink layer and the thermosetting resin that is water-based resin (thermosetting water-based resin) of the surface protective layer were higher in the ink adhesion than the decorative sheets of Comparative Examples not containing the curing agents mentioned above in the ink layer and the surface protective layer. In Comparative Example 1 in which the curing agent was not added to the ink layer or the surface protective layer, the ink adhesion decreased and the scratch resistance decreased. In Comparative Example 2 in which a mixture of the water-based ink and the isocyanate-based curing agent was used, the isocyanate-based curing agent reacted with water in the water-based ink, and the gelation of the ink occurred, so that the ink layer was not able to be formed.

The curling property of the decorative sheet is better in the decorative sheets of Examples 1 to 12, 14 in which the thermoplastic resin layer is formed of the thermoplastic resin with a melting point of 140° C. or higher than in the decorative sheet of Example 13 in which the thermoplastic resin layer is formed of the thermoplastic resin with a melting point of less than 140° C. When the water-based ink is used for the ink layer, heat is applied to a sheet body for drying the ink. Therefore, when the melting point of the thermoplastic resin is equal to or higher than a predetermined temperature, the thermoplastic resin layer was not softened even when heat was applied, so that the decorative sheet free from warpage was obtained.

Further, when the addition amount of the xylene diamine-based curing agent, the polycarbodiimide-based curing agent, or the aziridine-based curing agent to the ink layer is 1 part by mass or more and 30 parts by mass or less, the ink adhesion was improved, and when the addition amount is 3 parts by mass or more and 10 parts by mass or less, there was no surface where the ink layer was peeled off, and the ink adhesion was further improved.

The decorative sheet of the present disclosure is not limited to the embodiment and Examples described above, and can be variously altered within the scope in which the features of the invention are not impaired.

REFERENCE SIGNS LIST 1 decorative sheet
11 base paper
12 thermoplastic resin layer
13 ink layer
13A solid ink layer
13B pattern layer
14 surface protective layer
14A surface protective layer

The invention claimed is:

1. A decorative sheet comprising:
a base paper;
a thermoplastic resin layer provided over a surface side of the base paper, the thermoplastic resin layer consisting of polypropylene (PP) having a melting temperature of 140° C. or higher or polyethylene terephthalate (PET) having a melting temperature of 140° C. or higher;
an ink layer provided over the thermoplastic resin layer and the base paper, the ink layer including a water-based ink and a xylene diamine-based curing agent as a curing agent, wherein an amount of the xylene diamine-based curing agent in the ink layer is 3 parts by mass or more and 10 parts by mass or less based on 100 parts by mass of the water-based ink; and
a surface protective layer provided over the ink layer, the thermoplastic resin layer, and the base paper such that the base paper, the thermoplastic resin layer, the ink layer, and the surface protective layer are formed in this order, wherein the surface protective layer contains a thermosetting resin as a water-based resin and the xylene diamine-based curing agent.

2. The decorative sheet according to claim 1, wherein a thickness of the thermoplastic resin layer is 90% or less than a thickness of the base paper.

3. The decorative sheet according to clam 1, wherein the ink layer consists of: (a) a solid water-based ink layer, provided on and entirely covering the thermoplastic resin layer, for imparting hue to the decorative sheet; and
(b) a patterned water-based ink layer provided on the solid ink layer, such that the solid ink layer and the patterned ink layer include the xylene diamine-based curing agent or the aziridine-based curing agent.

\* \* \* \* \*